3,332,933
DIACYL N-ALKYL AMMONIUM ALGINATES AND THEIR PREPARATION

Richard G. Schweiger, San Diego, Calif., assignor to Kelco Company, San Diego, Calif., a corporation of California
No Drawing. Filed Feb. 21, 1964, Ser. No. 346,406
9 Claims. (Cl. 260—209.6)

The present invention relates to novel derivatives of diacyl alginic acids particularly of diacetyl alginic acid, dipropionyl alginic acid, and dibutyryl alginic acid, and still more particularly to certain N-substituted salts thereof.

As is well known, alginic acid is a substance derived from certain varieties of seaweed, and its common alkali metal salts, such as sodium alginate and potassium alginate, have found wide employment as a hydrophilic colloid. Other salts of alginic acid are known, in which the cation is not a simple metallic ion, but is a substituted ammonium cation, in which anywhere from one to four of the hydrogen atoms of the ammonium ion ($NH_4^+$) have been replaced with an alkyl radical or with an alkanol radical. Thus, ethylammonium, tri-isopropanolammonium, octylammonium, tetraethylammonium, and the like alginates have been described. Nomenclature is variable, and sometimes the cation is named after the free amine base, viz., ethyl amine alginate is synonomous with ethylammonium alginate, although the latter is the more proper terminology.

Substituted ammonium alginates of the types just described have been described in a number of patents, as follows: Preble Patent 2,158,485; McNeely Patent 2,688,598; McNeely Patent 2,979,499; and Steiner Patent 2,426,125. The disclosures of all of these patents are incorporated herein by reference.

As will be apparent from reviewing the disclosures of the above enumerated patents, the more heavily substituted ammonium alginates have solubility in organic solvents such as ethanol and isopropanol, only if some water is present. However, these prior art alginates are for many purposes not sufficiently oleophilic, and while I do not wish to be bound by any theory of action, it seems likely to me that the hydroxyl groups present in these alginates, that is to say, the hydroxyl groups which are part of the alginic acid polymer, are a limiting factor in any attempt to render substituted ammonium alginates more completely oleophilic. The latter is desired in many cases, as for example, when free solubility in mixed organic solvents, organic solvents other than the simple alcohols, and the like is desired.

An object of the present invention is to provide a derivative of alginic acid which is freely soluble in many organic solvents, and which may be cast as a film from solutions in the latter.

Another object of the invention is to provide new and useful derivatives of diacyl alginates, particularly the lower diacyl alginates.

Other objects of the invention will appear as the description thereof proceeds.

Generally speaking and in accordance with illustrative embodiments of my invention, I neutralize diacyl alginic acid, such as diacetyl alginic acid, dipropionyl alginic acid, or dibutyryl alginic acid with ammonium-derived cations which may be described as substituted ammonium ($NH_4^+$) in which at least one of the hydrogen atoms of said ammonium has been replaced by at least one radical chosen from the group consisting of alkyl having from two to eighteen carbon atoms inclusive; hydroxyalkyl having from two to eighteen carbon atoms inclusive; cyclohexyl; cyclohexanol; phenyl; and benzyl. Various specific examples will be given later herein.

The diacyl alginic acid used in carrying out my invention may be made by any available procedure. The one which I find best, and the only one of which at the present time I am aware of giving diacyl alginic acid as distinguished from acyl alginic acid of a lesser degree of substitution is to acetylate alginic acid in a mixture of the selected acyl anhydride and acetic acid using perchloric acid as a catalyst. This procedure is especially effective when the acyl selected is acetyl. Further details of this procedure are given in my co-pending patent application Ser. No. 113,082, filed May 29, 1961, and now abandoned the teachings of which are incorporated herein by reference. As shown at page 6 of my application Ser. No. 133,082, the maximum possible degree of substitution (D.S.) is 2.0 for alginic acid. Due to limitations on the purity of reactants, etc., the maximum D.S. values are slightly below the calculated value of 2.0. As shown in Examples VII and VIII of my copending application, Example VII being quite similar to the first portion of Example I in the present application, a diacetyl alginic acid prepared according to my process has a D.S. ranging between 1.5 and 2.0. This is particularly stated in line 23, page 12 of application Ser. No. 113,082. Thus the term "diacetyl" or "diacyl" as employed in the present application refers to a D.S. ranging from 1.5 to 2.0. I may also prepare the dipropionyl and dibutyryl derivatives of alginic acid by the same procedure. In this application by "lower acyl" I mean acetyl, propionyl and butyryl.

It will be seen from the above that representative compounds included within the scope of my invention are, by way of illustration and not by way of limitation, as follows:

ethylammonium diacetyl alginate
ethylammonium dipropionyl alginate
ethylammonium dibutyryl alginate
tetraethylammonium diacetyl alginate
tetraethylammonium dipropionyl alginate
tetraethylammonium dibutyryl alginate
hydroxyethylammonium diacetyl alginate
("ethanolammonium diacetyl alginate")
hydroxyethylammonium dipropionyl alginate
("ethanolammonium dipropionyl alginate")
hydroxyethylammonium dibutyryl alginate
("ethanolammonium dibutyryl alginate")
tri-hydroxyisopropylammonium diacetyl alginate
("tri-isopropanolammonium diacetyl alginate")
tri-hydroxyisopropylammonium dipropionyl alginate
("tri-isopropanolammonium dipropionyl alginate")
tri-hydroxyisopropylammonium dibutyryl alginate
("tri-isopropanolammonium dibutyryl alginate")
octylammonium diacetyl alginate
octylammonium dipropionyl alginate
octylammonium dibutyryl alginate
dioctylammonium diacetyl alginate
dioctylammonium dipropionyl alginate
dioctylammonium dibutyryl alginate
benzyltriethylammonium diacetyl alginate
benzyltriethylammonium dipropionyl alginate
benzyltriethylammonium dibutyryl alginate
cyclohexylammonium diacetyl alginate
cyclohexylammonium dipropionyl alginate
cyclohexylammonium dibutyryl alginate
dicyclohexylammonium diacetyl alginate
dicyclohexylammonium dipropionyl alginate
dicyclohexylammonium dibutyryl alginate
tri-n-heptylammonium diacetyl alginate
tri-n-heptylammonium dipropionyl alginate
tri-n-heptylammonium dibutyryl alginate
tri-caprylylammonium diacetyl alginate
tri-caprylylammonium dipropionyl alginate
tri-caprylylammonium dibutyryl alginate tri-laurylammonium diacetyl alginate
tri-laurylammonium dipropionyl alginate
tri-laurylammonium dibutyryl alginate Other members of the group will be readily apparent to those skilled in the art from the disclosure herein, and some other specific compounds will appear in the examples hereinbelow.

Generally speaking I may make my novel derivatives by direct neutralization of the diacetyl alginic acid with the free base concerned. Thus, for example, an aqueous solution of tri-hydroxyethyl amine ("triethanol amine") is simply mixed with an aqueous slurry of diacetyl alginic acid, the two reactants being present in equivalent quantities, or a simple salt of diacetyl alginic acid, such as sodium diacetyl alginate, may be mixed in aqueous solution with an equivalent quantity of a simple salt of the substituted ammonium compound, such as for example, lauryl ammonium chloride, likewise in aqueous solution. The resulting sodium chloride may be washed out of the recovered product when desired. The reaction may be assisted by suspending or dissolving the reactants in suitable organic solvents, or mixtures of organic solvents with water. Specific examples will appear later. The recovered product in accordance with the invention may be washed, dried, and powdered or granulated, depending upon the end use contemplated. The foregoing procedure is also used in the case of dipropionyl and dibutyryl alginic acids.

The examples to follow are illustrative of my invention using diacetyl alginic acid as the diacyl starting material. The first example hereinbelow recites a complete procedure for preparing diacetyl alginic acid, starting from raw materials all of which are common articles of commerce:

Example I 1000 g. of wet alginic acid (25% solids) were washed three times with 800 cc. of glacial acetic acid each time. After each washing the solvent was pressed out. Then the fibrous material was mixed in a Hobart mixer with 100 cc. of acetic acid and 1000 cc. of acetic anhydride. Three cc. of 70% perchloric acid in 0.1 cc. and 0.2 cc. portions and 500 cc. more of acetic anhydride in 100 cc. portions were added during a period of about 2 hours. Thus the temperature could be controlled easily and it was not allowed to exceed 35–40° C. The reaction mixture was extruded after about 3 hours then mixed thoroughly and washed with distilled water until the wash water had a pH of 4–5. Most of the water was pressed out.

Part of the diacetylated alginic acid was suspended in methanol and then mixed (in separate tests) with a calculated, equivalent amount of (a) octyl amine
(b) dicyclohexylamine
(c) triisopropanolylamine
(d) dioctylamine
(e) decylamine The mixtures were stirred until clear, very viscous solutions were obtained. The substituted ammonium diacetyl alginates from (a) to (c) were precipitated by pouring the syrup in a thin stream into acetone. The products were hardened by decanting the solvent and adding more acetone. The products then were filtered off and dried at 40° C. in an oven for 30 minutes in the presence of an air stream. Since (d) and (e) could not be precipitated with acetone they were spread on a plate and partially dried at 60° C. Then they were mixed with a mixture of acetone and ethyl acetate. The gummy products which were obtained were dried at 70° C. in the presence of an air stream. The yields of these products were quantitative.

Example II

Di-acetylated alginic acid as described above was suspended in a mixture (about 50:50) of isopropanol and benzene. Then a calculated equivalent amount of (a) distearylamine
(b) dilaurylamine
(c) trilaurylamine was added (in separate tests) and it was stirred until a clear, very viscous solution was obtained. The end product was precipitated by pouring the syrup in a thin stream into acetone as described above. The products from (a) and (b) were air dried at 50° C. (c) required a large quantity of acetone for the precipitation. This product was dried at 70–80° C.

Example III

Di-acetylated alginic acid as described in Example I was stirred with a mixture (about 50:50) of isopropanol and benzene. A calculated amount of (a) stearylamine
(b) tri-n-heptylamine
(c) tricaprylylamine was added and the mixture was stirred until a clear, very viscous solution was obtained. The syrup was poured into distilled water. The slimy precipitate was separated, dried at 70° C. in the presence of an air stream.

Example IV

Examples I to III were repeated, but the diacetylated alginic acid was incorporated directly with the amines. If necessary some solvent was added until a very stiff paste was obtained. This paste was warmed, dried at 45° C. and then milled to a coarse powder. The properties of these products were equal to those from the corresponding Examples I to III.

The solubilities of the products above are given in the following table:

| N-alkyl | Water | Methanol | Ethanol | Isopropanol | Glycol | Chloroform | Ethylene Dichloride | Ethyl Acetate | Dimethylformamide |
|---|---|---|---|---|---|---|---|---|---|
| -yl | ++ h | +++ | ++ | --- | ++ h | -- | (--) | -- | ++ h |
| -cyl | --- | +++ | ++ h | -- | ++ h | -- | --- | -- | ++ h |
| -adecyl | + | +++ | ++ h | --- | --- | -- | --- | -- | ++ h |
| -cyclohexyl | +++ | +++ | +++ | --- | ++ h | (+) | --- | -- | ++ h |
| -octyl | -- | +++ | +++ | ++ h | --- | ± | --- | -- | ++ h |
| -auryl | -- | -- h | -- h | + h | --- | (+) h | --- | -- h | + h |
| -tearyl | --- | -- h | --- | -- | --- | ±(+) h | --- | -- | (+) |
| -isopropanolyl | +++ | +++ | | | | | | | -- h |
| -n-heptyl | (--) | +++ | ++ (90%) | ++ (90%) | --- | +++ | -- | -- | ++ |
| -caprylyl | (--) h | + h | +++ h | + h | --- | +++ | ±± | ± | ++ h |
| -lauryl | --- | -, ± h | ++ | ++ | (--) h | ± (+) | | - h | +++ (hazy) |

See footnotes at end of tables.

| N-alkyl | Acetone | Benzene | Dioxane | 50% Isopropanol, 50% Benzene | 20% Isopropanol, 80% Benzene |
|---|---|---|---|---|---|
| Octyl | −−− | −−− | −−− | (−−) h | −−− |
| Decyl | −−− | −−− | −−− | (−−) h | −−− |
| Octadecyl | −−− | −−− | −−− | (−−) h | −− h |
| Dicyclohexyl | −−− | −−− | −−− | − h | −−− |
| Dioctyl | −−− | −−− | −−− | + h | − |
| Dilauryl | −−− | −−− | ± h | + h | ++ |
| Distearyl | −−− | ± | − h | ++ h | ±(+) h |
| Triisopropanolyl | −−− | −−− | −−− | −−− | −−− |
| Tri-n-heptyl | − | −−− | +++ h | ++ h | ± h |
| Tri-caprylyl | − | −−− | ±(+) h | ++ | ++ |
| Tri-lauryl | − | − | − | +++ | +++ |

−−− = insoluble.
−− = swells slightly.
− = swells.
± = swells very well.
+ = slowly soluble.
++ = soluble.
+++ = very soluble.
h = heated.

As appears from the table, in following the invention, products are obtained which have diverse solubility in various organic solvents and mixtures thereof. They are all useful for a variety of applications, even though they differ among themselves. A common characteristic is that if each individual substituted ammonium diacetyl alginate is compared with the corresponding compound made from alginic acid (as distinguished from the diacetyl derivative), then the solubility in and compatibility with any selected organic solvent will be found to be much greater. As suggested hereinabove, I believe that this improvement in property stems from the replacement of two hydroxyl groups in each of the structural units of the alginic acid (and two is all that there are in each such unit) by the relatively highly organophillic acetyl groups.

As an example of the utility of the invention I prepared a suspension of metal powder in an organic solvent. More particularly I prepared a 3% solution of the dioctyl derivative in ethanol. To this I added a powdered stainless steel and a suspension suitable for use in spraying operations was produced.

While my invention has been described with the aid of numerous specific examples, wherein particular components, reaction temperatures and times, and the like have been recited it will be apparent that my invention is a broad one, and many variations in detail, including choice of reactant, reaction conditions, proportions and the like, are all permissible within the broad scope of the invention, in accordance with the claims which follow.

What I claim is:

1. A salt of a lower diacyl alginic acid in which the cation is substituted ammonium ($NH_4^+$) in which at least one of the hydrogen atoms of said ammonium have been replaced by at least one radical chosen from the group consisting of alkyl having from two to eighteen carbon atoms inclusive; cyclohexyl; cyclohexanol; phenyl; and benzyl.

2. A salt in accordance with claim 1 in which the diacyl alginic acid is diacetyl alginic acid.

3. A salt in accordance with claim 1 in which the diacyl alginic acid is dipropionyl alginic acid.

4. A salt in accordance with claim 1 in which the diacyl alginic acid is dibutyryl alginic acid.

5. Dioctylammonium diacetyl alginate having a D.S. from 1.5 to 2.0.

6. Dicyclohexylammonium diacetyl alginate having a D.S. from 1.5 to 2.0.

7. Tri-n-heptylammonium diacetyl alginate having a D.S. from 1.5 to 2.0.

8. Tri-caprylylammonium diacetyl alginate having a D.S. from 1.5 to 2.0.

9. Tri-laurylammonium diacetyl alginate having a D.S. from 1.5 to 2.0.

References Cited

UNITED STATES PATENTS

| | | | |
|---|---|---|---|
| 2,158,487 | 5/1939 | Preble | 260—209.6 |
| 2,589,226 | 3/1952 | Carson | 260—209.6 |

DONALD E. CZAJA, *Primary Examiner.*

LEON J. BERCOVITZ, *Examiner.*

R. W. MULCAHY, *Assistant Examiner.*